(12) United States Patent
Sakagami et al.

(10) Patent No.: US 9,716,377 B2
(45) Date of Patent: Jul. 25, 2017

(54) ELECTRICAL WIRE PROTECTION MEMBER

(71) Applicant: Sumitomo Wiring Systems, Ltd., Yokkaichi, Mie (JP)

(72) Inventors: Noriyuki Sakagami, Mie (JP); Hirokazu Nakai, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/134,493

(22) Filed: Apr. 21, 2016

(65) Prior Publication Data

US 2016/0336097 A1    Nov. 17, 2016

(30) Foreign Application Priority Data

May 11, 2015    (JP) .................. 2015-096265

(51) Int. Cl.
*H01B 17/58* (2006.01)
*H01B 17/26* (2006.01)
*H02G 15/013* (2006.01)
*H02G 3/04* (2006.01)

(52) U.S. Cl.
CPC ......... *H02G 15/013* (2013.01); *H02G 3/0406* (2013.01); *H02G 3/0468* (2013.01)

(58) Field of Classification Search
CPC ...... H02G 15/013; H02G 3/04; H02G 3/0406; H02G 3/0468; H02G 3/06; H02G 3/0691; H02G 3/22; H02G 3/24; H02G 3/26; H01L 7/0045; H01L 7/184; B60R 16/0215; B60R 16/0222
See application file for complete search history.

(56) References Cited

U.S. PATENT DOCUMENTS

| | | | | |
|---|---|---|---|---|
| 6,019,615 A | * | 2/2000 | Masuda | H01R 9/0518 174/653 |
| 6,042,396 A | * | 3/2000 | Endo | H01R 9/0527 174/652 |
| 6,053,749 A | * | 4/2000 | Masuda | H01R 13/5202 439/98 |
| 2002/0157843 A1 | * | 10/2002 | Fukushima | H01R 9/032 174/353 |
| 2015/0010842 A1 | | 1/2015 | Ando et al. | |
| 2015/0200530 A1 | * | 7/2015 | Chiu | H02G 15/007 174/653 |

* cited by examiner

*Primary Examiner* — Timothy Thompson
*Assistant Examiner* — Amol Patel
(74) *Attorney, Agent, or Firm* — Reising Ethington, PC (57) ABSTRACT

An electric wire protection member that prevents a connector or a terminal portion from coming into contact with water due to water intruding into a grommet. The electrical wire protection member disclosed by this specification includes a tube-shaped corrugated tube that protects electrical wires; a tube-shaped grommet that has a connection tube portion for connection to an opening end portion of the corrugated tube, and protects the electrical wires in place of the corrugated tube; a tube-shaped holder that has a mating tube portion that is fitted into the connection tube portion of the grommet, and abuts against the opening end portion of the corrugated tube; and a rubber stopper that has electrical wire sealing holes into which the electrical wires are inserted in a sealed state, and that comes into close contact with the inner peripheral surface of the holder.

3 Claims, 7 Drawing Sheets

ELECTRICAL WIRE PROTECTION MEMBER

This Application claims the benefit of Japanese Application No. JP2015-096265, filed on May 11, 2015, the contents of which are hereby incorporated by reference in their entirety.

FIELD

The technology disclosed by the present specification relates to an electrical wire protection member.

BACKGROUND

Conventionally, an underfloor harness is arranged at a location that is, for example, between a motor and an inverter in a hybrid automobile or an electric automobile, and includes a metal pipe into which electrical wires are inserted for the purpose of, for example, waterproofing and protection from flying rocks. Such an underfloor harness is provided along the lower surface of a floor panel. A flexible exterior member such as a corrugated tube or a grommet is connected to an end portion of the metal pipe, and electrical wires, which have been inserted into the exterior member, are introduced into the engine compartment or the rear vehicle compartment. For example, a waterproof cover disclosed in JP 2013-241143A (hereinafter, referred to as Patent Document 1) is known as an example of this type of exterior member.

However, an exterior member such as a corrugated tube is made of resin, and if a crack forms, there is a risk of water intruding into the exterior member, coming into contact with the electrical wires, and intruding into the engine room and the rear vehicle compartment. Furthermore, there is a risk of the water coming into contact with a connector or a terminal portion that is connected to the terminal of an electrical wire.

SUMMARY

An electrical wire protection member disclosed by the present specification includes: a tube-shaped corrugated tube capable of protecting an electrical wire; a tube-shaped grommet that has a connection tube portion for connection to an opening end portion of the corrugated tube, and is capable of protecting the electrical wire in place of the corrugated tube; a tube-shaped holder that has a mating tube portion that is fitted into the connection tube portion of the grommet, and abuts against the opening end portion of the corrugated tube; and a rubber stopper that has an electrical wire sealing hole into which the electrical wire is inserted in a sealed state, and comes into close contact with an inner peripheral surface of the holder.

According to this configuration, in the case where, for example, a crack forms in the corrugated tube, and water intrudes into the corrugated tube through the crack, even if the water attempts to intrude into the grommet, the intrusion of water is prevented by the rubber stopper. Accordingly, it is possible to prevent water from coming into contact with a connector or a terminal portion due to water intruding into the grommet.

This means that waterproofing inward of the grommet can be maintained even in the case of using a split corrugated tube that does not have waterproofing ability in the first place, and therefore the task of covering the electrical wire with the corrugated tube can be made easier by using a split corrugated tube.

The electrical wire protection member disclosed by the present specification may have the following configuration.

The holder may be an integrated holder, and a tapered insertion guiding surface may be provided in an opening edge portion on a corrugated tube side of the holder.

According to this configuration, the rubber stopper is more easily inserted along the insertion guiding surface, thus facilitating the task of mounting the rubber stopper in the holder.

The above electrical wire protection member may have a configuration in which the rubber stopper is housed inside the mating tube portion of the holder.

According to this configuration, even if the mating tube portion deforms so as to expand due to being subjected to a reaction force from the rubber stopper, the outer circumferential surface of the mating tube portion and the inner peripheral surface of the connection tube portion more forcibly come into close contact with each other due to the mating tube portion of the holder being fitted inside the connection tube portion of the grommet, and thus waterproofing ability is ensured.

The above electrical wire protection member may have a configuration in which the rubber stopper is housed inside a flange portion provided on a base end side of the mating tube portion of the holder.

According to this configuration, even in the case where, for example, sufficient space for mounting the rubber stopper cannot be ensured inside the mating tube portion of the holder due to the inner diameter of the connection tube portion of the grommet being too small, sufficient space can be ensured inside the flange portion, thus making it easier to ensure space for mounting the rubber stopper.

The above electrical wire protection member may have a configuration in which the rubber stopper is housed inside a flange portion provided on a base end side of the mating tube portion in the holder, and the holder includes a pair of divided holders and a lock portion that holds the pair of divided holders in a state of being assembled to each other.

According to this configuration, the task of mounting the rubber stopper into the flange portion can be performed easily.

According to the technology disclosed by the present specification, it is possible to prevent water from coming into contact with a connector or a terminal portion due to water intruding into a grommet.

DESCRIPTION

First Embodiment

Figure 1:
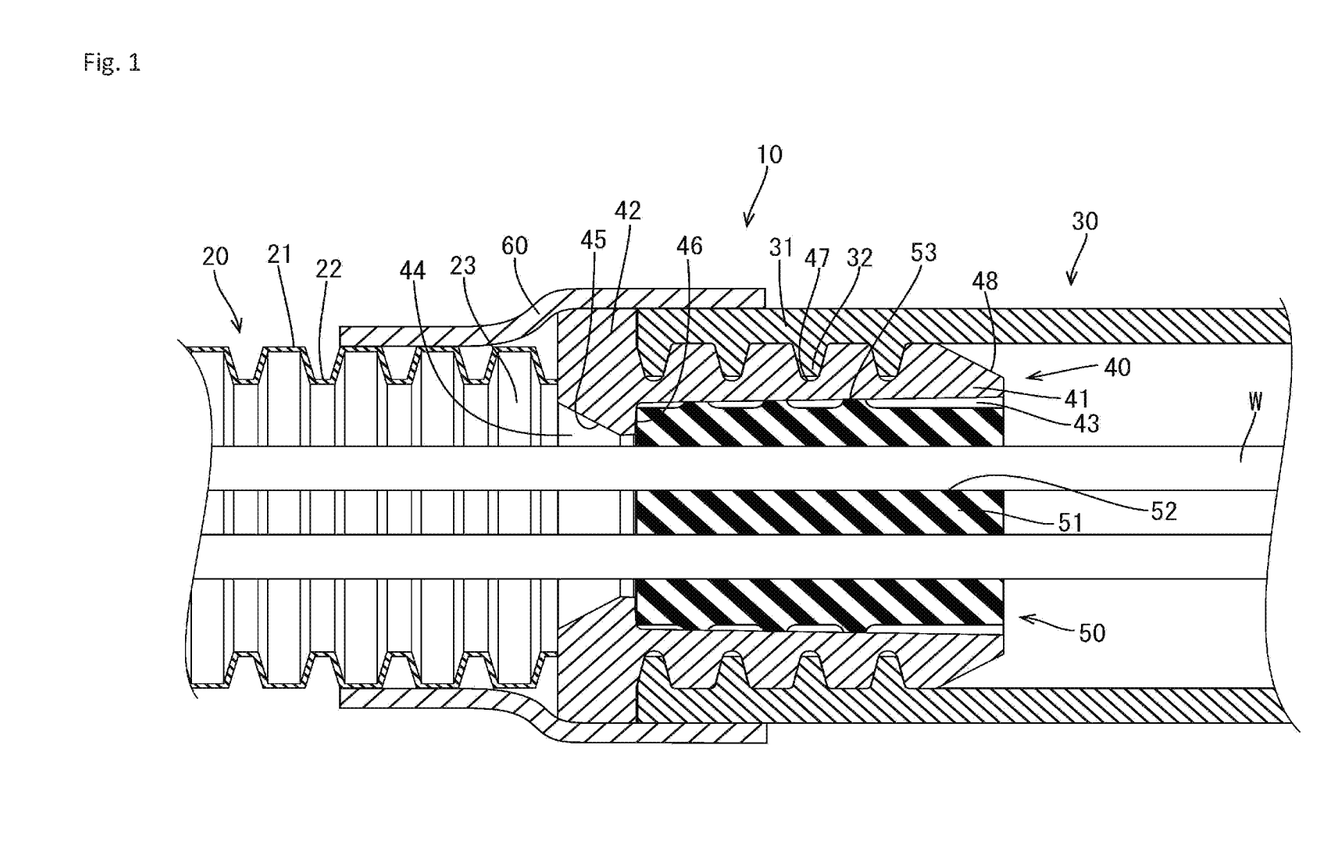
FIG. 1 is a cross-sectional view of an internal structure of an electrical wire protection member according to a first embodiment.

The following describes a first embodiment with reference to FIGS. 1 to 4. As shown in FIG. 1, an electrical wire protection member 10 of the present embodiment is configured to include a corrugated tube 20, a grommet 30, a holder 40, and a rubber stopper 50. The corrugated tube 20 and the holder 40 are both made of resin, and the grommet 30 and the rubber stopper 50 are both made of rubber or an elastomer.

The corrugated tube 20 is a known corrugated tube configured with a bellows shape in which mountain portions 21 and valley portions 22 are arranged side-by-side alternatingly. Also, the grommet 30 has a connection tube portion 31 provided such that an opening end portion 23 of the corrugated tube 20 can originally be fitted therein, and multiple inner protrusion portions 32 are arranged side-by-side in the axial direction on the inner circumference of the connection tube portion 31. The pitch of the inner protrusion portions 32 matches the pitch of the valley portions 22. Accordingly, in a conventional configuration of the present embodiment, the corrugated tube 20 and the grommet 30 are directly connected to each other by fitting the opening end portion 23 of the corrugated tube 20 into the connection tube portion 31 and then wrapping a tying band (not shown) around the connection tube portion 31.

However, with a configuration in which the corrugated tube 20 and the grommet 30 are directly connected to each other in this way, if a crack forms in the corrugated tube 20, and water intrudes into the interior, there is a risk that the water intrudes into the grommet 30 and comes into contact with a connector or a terminal portion (not shown) behind the grommet 30. In view of this, in the present embodiment, as shown in FIG. 1, the holder 40 is arranged between the corrugated tube 20 and the grommet 30, and the rubber stopper 50 is mounted inside the holder 40, thus cutting off the flow of water heading from the interior of the corrugated tube 20 to the interior of the grommet 30.

The holder 40 is configured to include a mating tube portion 41 that is fitted into the connection tube portion 31 of the grommet 30, and a flange portion 42 that is provided on the base end side of the mating tube portion 41 (the end portion on the corrugated tube 20 side). The flange portion 42 is shaped so as to protrude radially outward with a larger diameter than the mating tube portion 41. The space on the radially inward side of the mating tube portion 41 is a housing space 43 in which the rubber stopper 50 is housed. Also, the space on the radially inward side of the flange portion 42 is an introduction hole 44 that introduces the rubber stopper 50 into the housing space 43, and this introduction hole 44 and the housing space 43 are in communication with each other.

Figure 2:
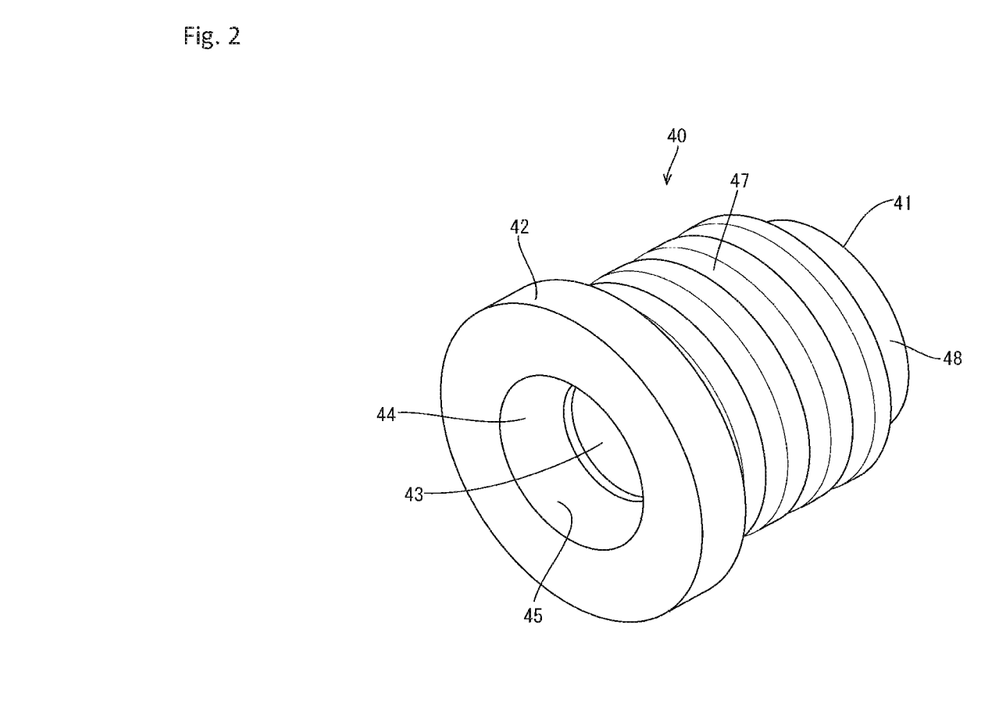
FIG. 2 is a perspective view of a holder.

As shown in FIG. 2, the inner peripheral surface of the introduction hole 44 is a tapered insertion guiding surface 45 whose inner diameter decreases as it approaches the housing space 43. Also, as shown in FIG. 1, the minimum inner diameter of the insertion guiding surface 45 is smaller than the minimum inner diameter of the housing space 43, and therefore the inner peripheral surface of the insertion guiding surface 45 and the inner peripheral surface of the housing space 43 are connected by a perpendicular surface 46 that extends in the diameter direction. After being introduced into the housing space 43, the rubber stopper 50 is prevented from falling out of the introduction hole 44 due to coming into contact with the perpendicular surface 46.

On the other hand, the maximum inner diameter of the introduction hole 44 is smaller than the minimum inner diameter of the corrugated tube 20. For this reason, the opening end portion 23 of the corrugated tube 20 can abut against the front surface of the flange portion 42 (the surface on the side opposite to the mating tube portion 41).

Figure 3:
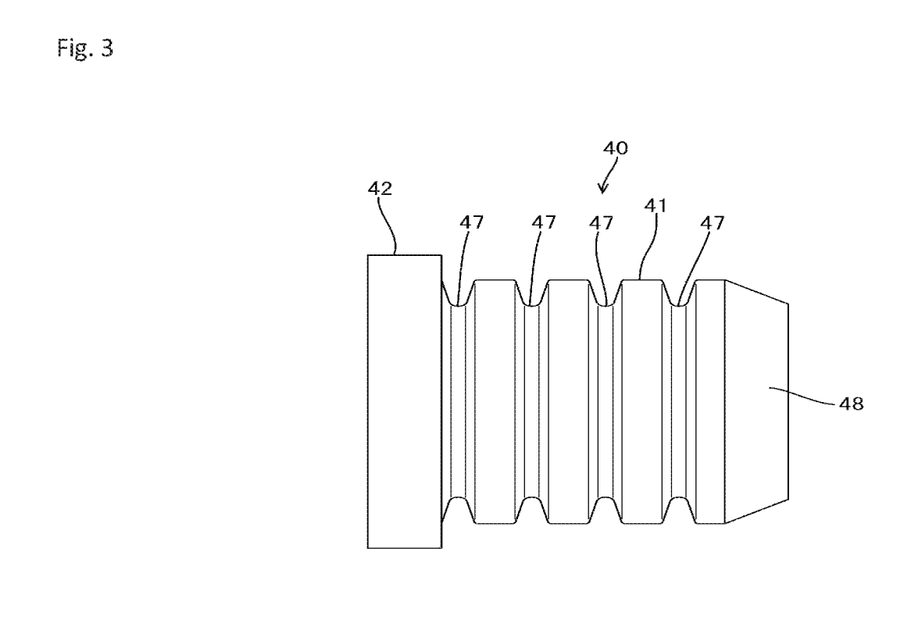
FIG. 3 is a side view of the holder.

As shown in FIG. 3, multiple ring-shaped recession portions 47, into which the inner protrusion portions 32 respectively fit, are provided on the outer circumferential surface of the mating tube portion 41. Accordingly, the mating tube portion 41 is fitted at a regular position inside the connection tube portion 31, and is prevented from falling out. Also, a tapered guide surface 48 that approaches the housing space 43 as it extends toward the tip is provided in the tip portion of the mating tube portion 41 (the end portion on the side opposite to the flange portion 42). The inner protrusion portions 32 slide up the guide surface 48 so as to allow the fitting into the mating tube portion 41 to be performed smoothly.

Figure 4:
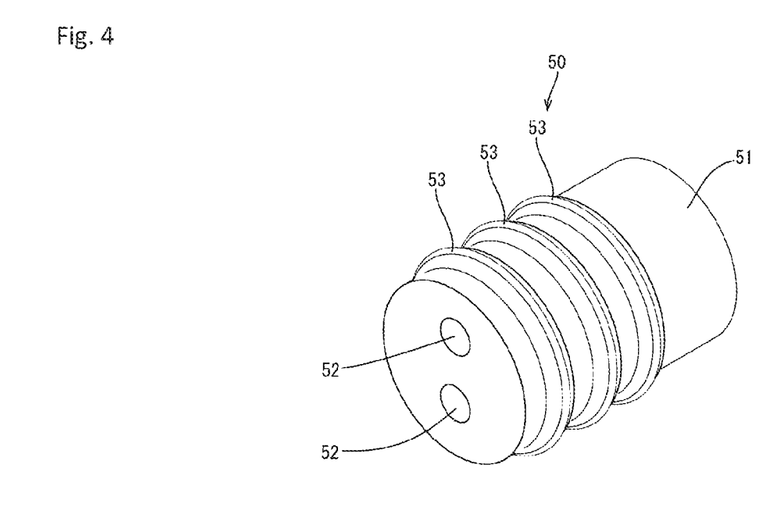
FIG. 4 is a perspective view of a rubber stopper.

The rubber stopper 50 has a main body portion 51 shaped as a circular column, and multiple electrical wire sealing holes 52, into which respective electrical wires W are inserted in a sealed state, are provided in the main body portion 51. Also, multiple outer lips 53 are provided on the outer circumferential surface of the main body portion 51. These outer lips 53 come into close contact with the inner peripheral surface of the mating tube portion 41 over the entire circumference thereof. Accordingly, if water attempts to intrude from the interior of the corrugated tube 20 into the grommet 30 through the introduction hole 44, the intrusion of the water is prevented by the rubber stopper 50, and the water does not intrude into the grommet 30.

Also, a heat-shrinking tube 60 is provided in a region that extends from the outer circumferential surface of the connection tube portion 31, passes over the outer circumferential surface of the flange portion 42, and extends to the outer circumferential surface of the corrugated tube 20. Accordingly, the heat-shrinking tube 60 can prevent water from intruding between the connection tube portion 31 and the mating tube portion 41, and prevent water from intruding between the corrugated tube 20 and the flange portion 42.

As described above, according to the present embodiment, in the case where, for example, a crack forms in the corrugated tube 20, and water intrudes into the corrugated tube 20 through the crack, even if the water attempts to intrude into the grommet 30, the intrusion of the water is prevented by the rubber stopper 50. Accordingly, it is possible to prevent water from coming into contact with a connector or a terminal portion due to water intruding into the grommet 30.

This means that waterproofing inward of the grommet 30 can be maintained even in the case of using a split corrugated tube 20 that does not have waterproofing ability in the first place, and therefore the task of covering the electrical wires W with the corrugated tube 20 can be made easier by using a split corrugated tube 20.

Also, a configuration is possible in which the holder 40 is an integrated holder 40, and the tapered insertion guiding surface 45 is provided on the opening edge portion on the corrugated tube 20 side of the holder 40 (the inner peripheral surface of the introduction hole 44).

According to this configuration, the rubber stopper 50 is more easily inserted along the insertion guiding surface 45, thus facilitating the task of mounting the rubber stopper 50 in the holder 40.

A configuration is possible in which the rubber stopper 50 is housed inside the mating tube portion 41 of the holder 40.

According to this configuration, even if the mating tube portion 41 deforms so as to expand due to being subjected to a reaction force from the rubber stopper 50, the outer circumferential surface of the mating tube portion 41 and the inner peripheral surface of the connection tube portion 31 more forcibly come into close contact with each other due to the mating tube portion 41 of the holder 40 being fitted inside the connection tube portion 31 of the grommet 30, and thus waterproofing ability is ensured.

Second Embodiment

Figure 5:
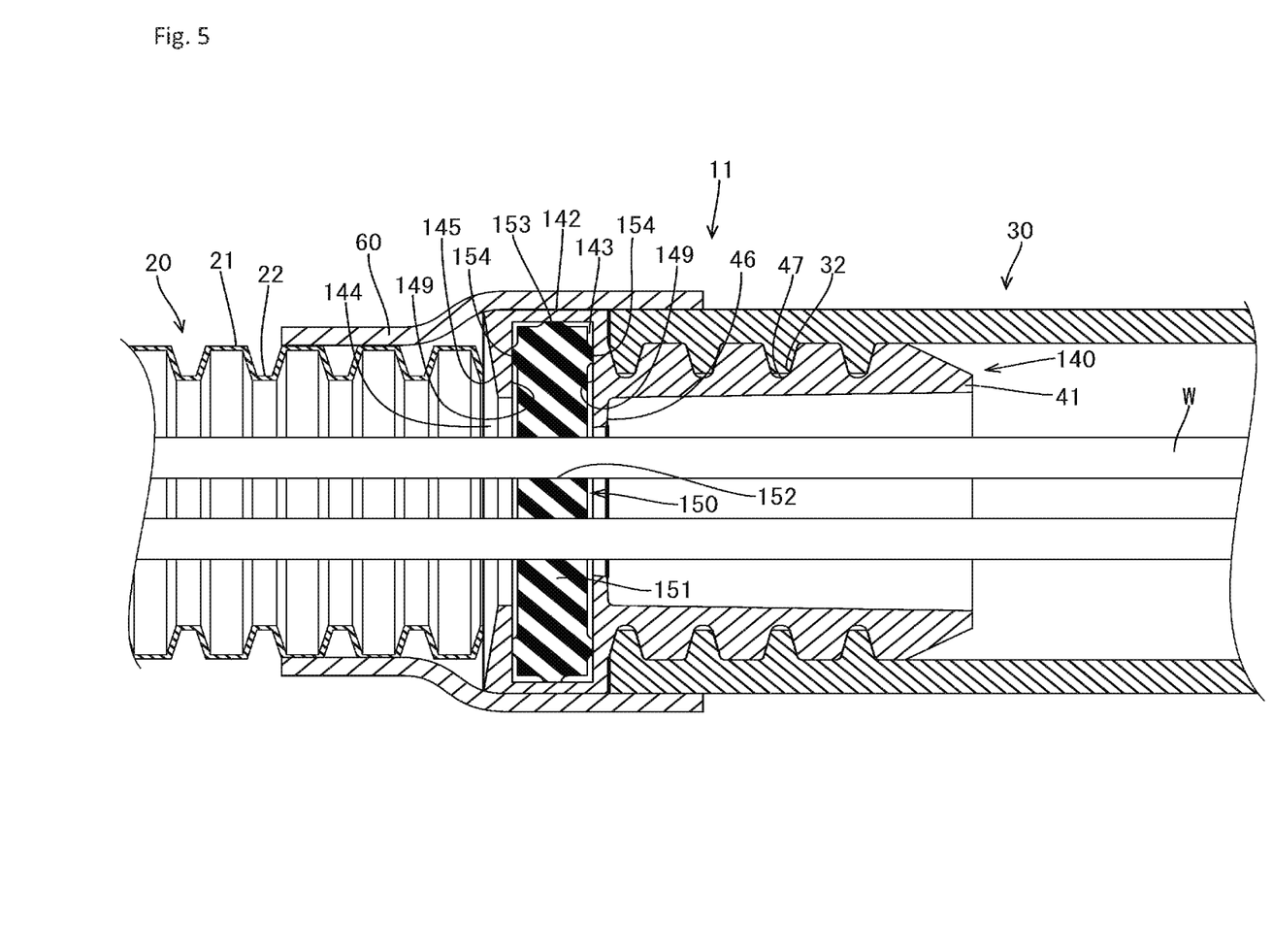
FIG. 5 is a cross-sectional view of an internal structure of an electrical wire protection member according to a second embodiment.
Figure 6:
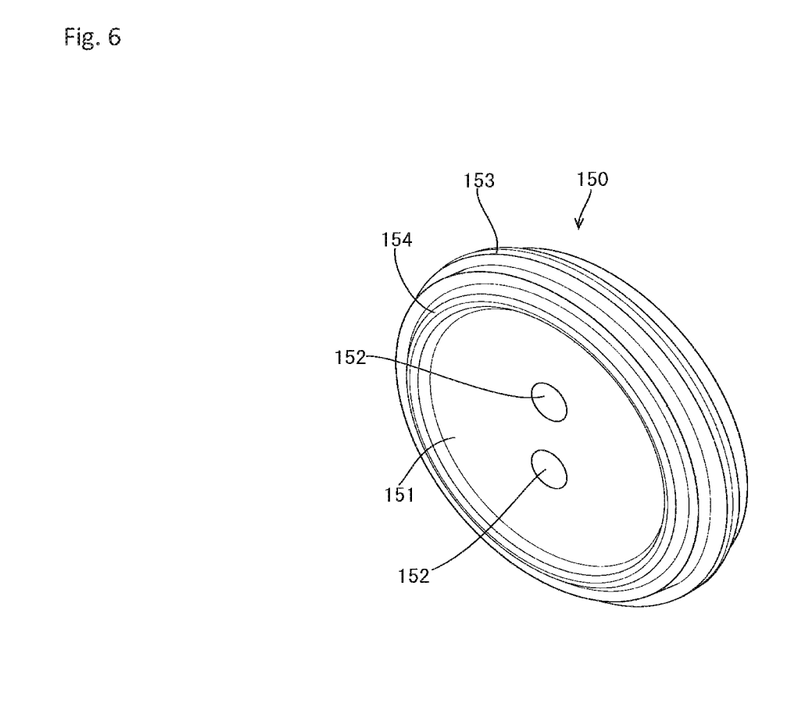
FIG. 6 is a perspective view of a rubber stopper.

Next, a second embodiment will be described with reference to FIGS. 5 and 6. An electrical wire protection member 11 of the present embodiment is a partial modification to the configurations of the holder 40 and the rubber stopper 50 of the first embodiment, and other configurations thereof are the same and will be denoted by the same reference signs as in the first embodiment.

A holder 140 of the present embodiment is configured to include the mating tube portion 41 as in first embodiment and a flange portion 142 provided on the base end side thereof. The interior of the flange portion 142 is a housing space 143 in which a rubber stopper 150 is housed. Note that in the present embodiment as well, an insertion guiding surface 145 similar to the insertion guiding surface 45 of the first embodiment is provided, and this insertion guiding surface 145 is an inclined surface with a gentler incline than in the first embodiment. For this reason, an introduction hole 144 is also a hole that is shallower in the axial direction than in the first embodiment. Also, the circumferential wall that constitutes the insertion guiding surface 145 serves to prevent the rubber stopper 150 from falling out.

The rubber stopper 150 has a main body portion 151 that is shorter in the axial direction than the rubber stopper 50 in the first embodiment and is shaped as a flattened circular column, and multiple electrical wire sealing holes 152, into which respective electrical wires W are inserted in a sealed state, are provided in the main body portion 151. Also, one outer lip 153 is provided on the outer circumferential surface of the main body portion 151. This outer lip 153 comes into close contact with the inner peripheral surface of the flange portion 142 over the entire circumference thereof. Furthermore, a pair of front and rear auxiliary lips 154 are provided on the front and rear surfaces of the main body portion 151 that are adjacent to the outer circumferential surface. These auxiliary lips 154 come into close contact with a pair of opposing surfaces 149 inside the flange portion 142 that oppose the front and rear surfaces of the main body portion 151, over the entire circumference of the opposing surfaces 149.

According to this configuration, even in the case where, for example, sufficient space for mounting the rubber stopper cannot be ensured inside the mating tube portion of the holder due to the inner diameter of the connection tube portion of the grommet being too small, sufficient space can be ensured inside the flange portion 142, thus making it easier to ensure space for mounting the rubber stopper 150.

Third Embodiment

Figure 7:
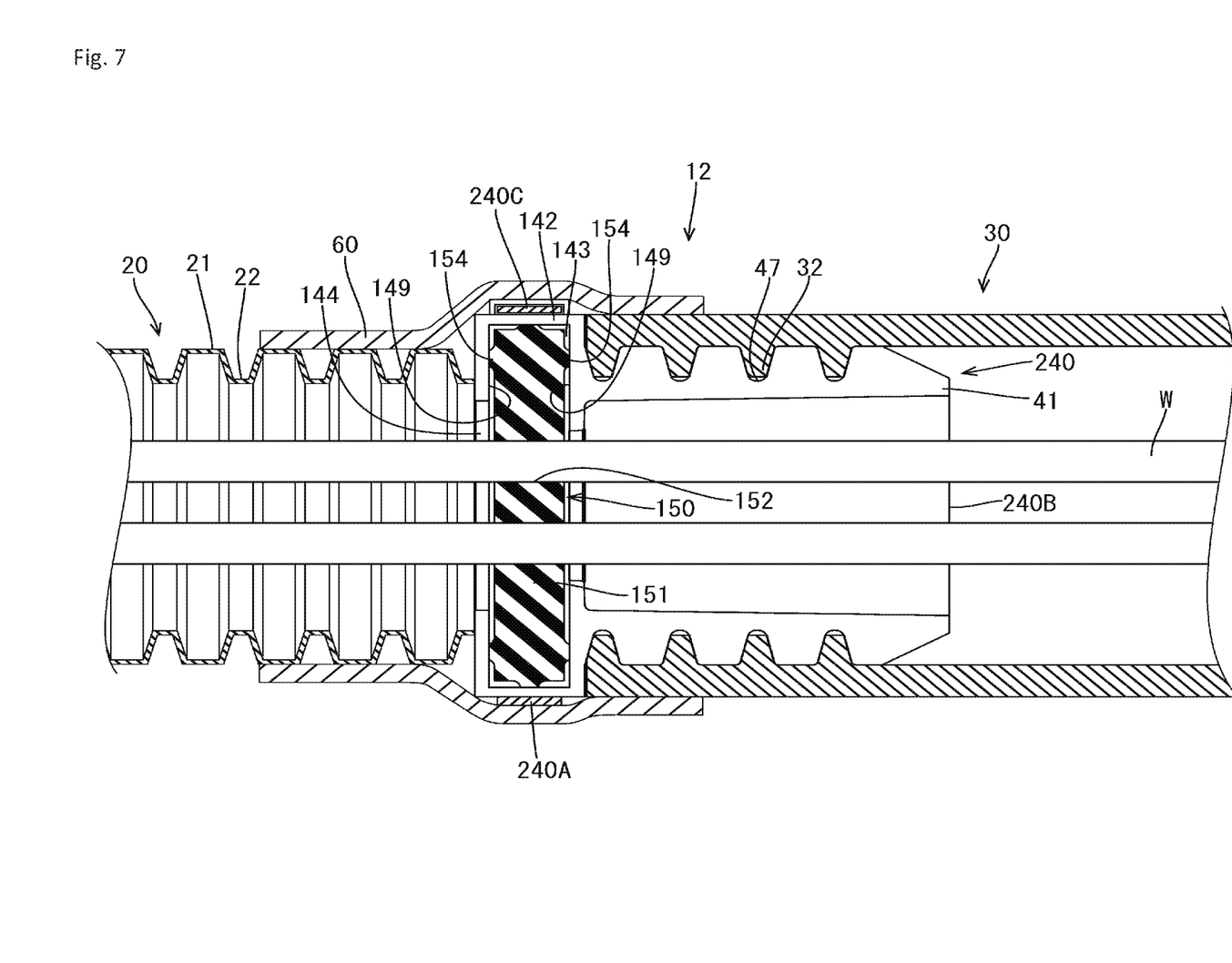
FIG. 7 is a cross-sectional view of an internal structure of an electrical wire protection member according to a third embodiment.

Next, a third embodiment will be described with reference to FIG. 7. An electrical wire protection member 12 of the present embodiment is a partial modification to the configuration of the holder 140 of the second embodiment, and other configurations thereof are the same and will be denoted by the same reference signs as in the second embodiment.

A holder 240 of the present embodiment is configured to include a pair of divided holders 240B that are coupled by a hinge 240A, and a lock portion 240C that holds the pair of divided holders 240B in a state of being assembled to each other. The hinge 240A and the lock portion 240C are provided on the outer circumferential surface side of respective opposing portions of a flange portion 242.

According to this configuration, the holder 240 does not need to be inserted before the electrical wires W, and it is easy to perform the task of mounting the rubber stopper 150 in the flange portion 242.

Other Embodiments

The technology disclosed by the present specification is not limited to the embodiments described above using the foregoing description and drawings, and various configurations such as the following are also included in the present invention.

Although two electrical wires W are disclosed in the above embodiments, one electrical wire W may be provided, or three or more may be provided. Also, the electrical wires W may have any application, such as being a power line or a signal line.

Although a region that extends from the outer circumferential surface of the corrugated tube 20 to the outer circumferential surface of the grommet 30 is sealed by the heat-shrinking tube 60 in the above embodiments, this region may be sealed by wrapped tape.

Although a non-split corrugated tube 20 is given as an example in the above embodiments, a split corrugated tube 20 may be used, as described above.

Besides the above embodiments, the rubber stopper may be housed in both the flange portion and the mating tube portion.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:
1. An electrical wire protection member, comprising:
 a tube-shaped corrugated tube capable of protecting an electrical wire;
 a tube-shaped grommet that has a connection tube portion for connection to an opening end portion of the corrugated tube, and is capable of protecting the electrical wire in place of the corrugated tube;
 a tube-shaped holder that has a mating tube portion that is fitted into the connection tube portion of the grommet, and abuts against the opening end portion of the corrugated tube; and a rubber stopper that has an electrical wire sealing hole into which the electrical wire is inserted in a sealed state, and comes into close contact with an inner peripheral surface of the holder;

wherein the holder is an integrated holder, a tapered insertion guiding surface is provided in an opening edge portion on a corrugated tube side of the holder, and the rubber stopper is housed inside the mating tube portion of the holder.

2. An electrical wire protection member, comprising:

a tube-shaped corrugated tube capable of protecting an electrical wire;

a tube-shaped grommet that has a connection tube portion for connection to an opening end portion of the corrugated tube, and is capable of protecting the electrical wire in place of the corrugated tube;

a tube-shaped holder that has a mating tube portion that is fitted into the connection tube portion of the grommet, and abuts against the opening end portion of the corrugated tube; and a rubber stopper that has an electrical wire sealing hole into which the electrical wire is inserted in a sealed state, and comes into close contact with an inner peripheral surface of the holder;

wherein the holder is an integrated holder, a tapered insertion guiding surface is provided in an opening edge portion on a corrugated tube side of the holder, and the rubber stopper is housed inside a flange portion provided on a base end side of the mating tube portion of the holder.

3. An electrical wire protection member, comprising:

a tube-shaped corrugated tube capable of protecting an electrical wire;

a tube-shaped grommet that has a connection tube portion for connection to an opening end portion of the corrugated tube, and is capable of protecting the electrical wire in place of the corrugated tube;

a tube-shaped holder that has a mating tube portion that is fitted into the connection tube portion of the grommet, and abuts against the opening end portion of the corrugated tube; and a rubber stopper that has an electrical wire sealing hole into which the electrical wire is inserted in a sealed state, and comes into close contact with an inner peripheral surface of the holder;

wherein the rubber stopper is housed inside a flange portion provided on a base end side of the mating tube portion of the holder, and the holder includes a pair of divided holders and a lock portion that holds the pair of divided holders in a state of being assembled to each other.

* * * * *